United States Patent [19]

Harms et al.

[11] Patent Number: 6,070,147
[45] Date of Patent: *May 30, 2000

[54] CUSTOMER IDENTIFICATION AND MARKETING ANALYSIS SYSTEMS

[75] Inventors: Brent Harms, Apple Valley; Kurt Johnson, St. Paul, both of Minn.

[73] Assignee: Tecmark Services, Inc., St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,527

[22] Filed: Jul. 2, 1996

[51] Int. Cl.[7] .......................... G06F 17/60; G06F 151/00
[52] U.S. Cl. .................................. 705/14; 705/10; 705/26
[58] Field of Search .................................. 395/219, 201; 235/375, 376, 383, 379; 364/401, 402; 382/100, 137, 139; 705/27, 14, 21, 10, 7, 26

[56] References Cited

U.S. PATENT DOCUMENTS

| | | | |
|---|---|---|---|
| 4,654,793 | 3/1987 | Elrod | 364/401 |
| 4,825,045 | 4/1989 | Humble | 235/383 |
| 4,872,113 | 10/1989 | Dinerstein | 364/401 |
| 4,906,826 | 3/1990 | Spencer | 235/379 |
| 4,908,761 | 3/1990 | Tai | 364/401 |
| 5,245,533 | 9/1993 | Marshall | 364/401 |
| 5,331,544 | 7/1994 | Lu et al. | 364/401 |
| 5,430,644 | 7/1995 | Deaton et al. | 364/401 |
| 5,448,471 | 9/1995 | Deaton et al. | 364/401 |
| 5,459,306 | 10/1995 | Stein et al. | 235/383 |
| 5,478,989 | 12/1995 | Shepley | 235/375 |
| 5,493,105 | 2/1996 | Desai | 235/375 |
| 5,687,322 | 11/1997 | Deaton et al. | 395/214 |
| 5,710,886 | 1/1998 | Christensen et al. | 395/214 |

OTHER PUBLICATIONS

Lena H. Sun, "Giant to Test Supermarket Cash Rebates", The Washington Post, Section A–News DC, p. A01, Jun. 14, 1989.

Michael Freitag, In This Computer Age, Who Needs Coupons?, New York Times, Section A, p. 1, col. 2, Jun. 15, 1989.

Lena H. Sun, "Checking Out the Customer; New Technology Can Give Stores Detailed Knowledge About Buyers' Habits", The Washington Post, Financial Section, P. H01, Jul. 9, 1989.

*Primary Examiner*—Eric W. Stamber
*Assistant Examiner*—Pedro R. Kanof
*Attorney, Agent, or Firm*—Dorsey & Whitney LLP

[57] ABSTRACT

A method and system for administering a loyalty marketing program (i.e., frequent buyer program) by using a government-issued identification card, such as a driver's license, as the frequent buyer redemption card. The data encoded onto the card may include a driver's license number, as the person's name and birth date. This information is used to tap into third party databases to gather further identification or demographic information about consumers. Incentives can be awarded in an efficient, personalized, and timely manner. Cost-effective and customer friendly administration of frequent-buyer incentive programs for marketing of goods and services is achieved.

18 Claims, 11 Drawing Sheets

| | | ID No. | 421346 | 411268 | |
|---|---|---|---|---|---|
| 60 | Identification | Name | Joe Smith | Kathleen King | |
| | | Address | 1074 Coral Drive Minneapolis, MN 55120 | | |
| 70 | Demographics | Median Income | $28,000 | | |
| | | Residence Type | single family | | |
| | | Median House Cost | $110,000 | | |
| | | Median Age | 46 | | |
| 80 | ABC Grocery Store | Summary | Visits | 3 | |
| | | | Items Purchased | 17 | |
| | | | Incentive Balance | $203.21 | |
| | | Transactions | 1 | Item | magazine |
| | | | | Cost | $2.95 |
| | | | | Date | 6/1/95 |
| | | | 2 | Item | soap |
| | | | | Cost | $3.99 |
| | | | | Date | 6/1/95 |
| | | | 3 | Item | toothpaste |
| | | | | Cost | $2.96 |
| | | | | Date | 6/3/95 |
| 90 | XYZ Fast Food Restaurant | Summary | Visits | | |
| | | | Incentive Balance | | |
| | | | 1 Month Balance | | |
| | | Transactions | 1 | Item | |
| | | | | Cost | |
| | | | | Date | |
| | | | 2 | Item | |
| | | | | Cost | |
| | | | | Date | |
| | | | 3 | Item | |
| | | | | Cost | |
| | | | | Date | |

Fig. 5

| Name | Address | License No. | Birthdate |
|---|---|---|---|
| Joe Smith | 1074 Coral Dr., Minneapolis, MN 55120 | 421346 | 06/28/62 |
| Kathleen King | 1234 Main Street, St. Paul, MN 55110 | 411268 | 08/26/61 |
| Ann T. Young | 3527 Lynn Dr., Fridley, MN 55418 | 396126 | 01/15/57 |
| Thomas P. White | 14 Peony Lane, Plymouth, MN 55426 | 381121 | 07/04/54 |
| Peter J. Anderson | 38 Chisolm St., Edina, MN 55438 | 420231 | 03/16/49 |

Fig. 7(a)

| License No. | Name | | | Address | | | | Birthdate |
|---|---|---|---|---|---|---|---|---|
| | Last | First | MI | Street | City | ST | ZIP | |
| 381121 | White | Thomas | P | 14 Peony Lane | Plymouth | MN | 55426 | 07/04/54 |
| 396126 | Young | Ann | T | 3527 Lynn Dr. | Fridley | MN | 55418 | 01/15/57 |
| 411268 | King | Kathleen | | 1234 Main St. | St. Paul | MN | 55110 | 08/26/61 |
| 420231 | Anderson | Peter | J. | 38 Chisolm St. | Edina | MN | 55438 | 03/16/49/61 |
| 421346 | Smith | Joe | | 1074 Coral Dr. | Minneapolis | MN | 55438 | 03/16/49/61 |

Fig. 7(b)

*ABC Grocery Store*

| Account Balance | Award Level |
|---|---|
| < 600 points | None |
| ≥ 600 points | 1 |
| ≥ 1200 points | 2 |
| ≥ 1500 points | 3 |
| ≥ 2500 points | 4 |

Fig. 8(a)

*XYZ Fast Food Restaurant*

| number of hamburger purchases in 1 month | award | number of visits in 3 months | award |
|---|---|---|---|
| 2 | medium soft drink | 5 | any sandwich |
| 3 | large soft drink | 6 | any sandwich & salad |
| ≥4 | hamburger, french fries & medium soft drink | ≥7 | sandwich, salad & soft drink |

Fig. 8(b)

CUSTOMER IDENTIFICATION AND MARKETING ANALYSIS SYSTEMS

FIELD OF THE INVENTION

The present invention relates to transaction processing and analysis systems, including check verification systems and frequent-buyer marketing programs, and to the capture of a consumer's name and other information through a government-issued identification card. In particular, the present invention relates to the use of such an identification system in connection with marketing applications.

BACKGROUND OF THE INVENTION

Businesses and establishments such as retail stores, malls, and restaurants often have a need to accurately record the identity of customers or visitors for marketing, security, and financial purposes. These businesses seek to encourage repeat customers and habitual shopping by customers. One way in which merchants and restauranteurs have encouraged repeat business has been through loyalty marketing programs, or what are sometimes known as frequent buyer programs. A loyalty marketing or frequency marketing program tracks the spending habits of the participating consumers at a given retail store, restaurant, mall or other groupings of merchants. When the consumer has made a certain number of purchases (defined by the loyalty/frequency marketing criteria), the consumer qualifies for some type of promotional action, which often means that the consumer can redeem points (or the like) for awards or purchase discounts.

There are two general types of loyalty marketing programs. The first type of program is one that follows an "automatic issuance" protocol. In this type of program, the award (or a certificate that can be exchanged for the award) is automatically issued to the customer when a pre-set purchase amount is reached. The second type of loyalty marketing program uses a bank account metaphor. A bank account (of either points or dollars) is used to keep score, and track the consumer's spending over a period of time. Purchases credit the balance in the bank account, and redemptions debit the balance.

Frequent-buyer programs can be a cost-effective way to target advertising and promotions to past customers. Past customers are a very responsive market segment, and by definition, these customers are aware of the advertiser's location, product, quality, and value levels. Reminding customers of the advantages of a familiar merchant is a very effective method of advertising. The customer mailing list created by these programs often cannot be created as effectively by other methods. Frequent-buyer programs also help merchants and service providers to gain incremental sales by offering their customers added value in a very visible way. Frequent-buyer programs are also used to capture competitors' customers and to attract new buyers to a product or service. The program awards are outside of the customer's usual budget, and allow purchases that normally would not come out of a business or family budget. For this reason, these programs are attractive to consumers.

In the past, a loyalty marketing program might be administered by issuing a specialized identification card to each of the consumers who wish to participate in the frequent buyer program. The cards are created and the program is administered by the retail store or a third party retained by the retail store to administer the program. Typically, the program requires that the consumer present the card to the clerk at the point of sale (e.g., check-out line) at the time purchases are made. The clerk then updates the card to reflect the new purchase, and/or uses the card to identify the participant and update a database that is set up to track purchases by the participants.

The success of prior loyalty marketing programs has been limited by a number of factors. Often, the consumer learns of the loyalty program from in-store signage, sales people, or advertising. Yet consumers do not always participate in the program because the consumer has to take the time to provide the information about him or herself necessary to administer the program, which may involve completing a form provided by the retail store. Also, those who do participate in the program cannot consistently do so effectively because they are required to carry with them the identification card issued by the retailer. The consumer will often neglect to carry the necessary card when visiting the store to make a purchase. Thus, because the consumer's identification card (and account number) are not always available, the consumer's purchases are not consistently and accurately recorded.

Merchants and restauranteurs may also be reluctant to engage in loyalty marketing programs because of the significant cost of issuing cards and purchasing the necessary equipment and materials. Administering the program can also be quite costly. Simply constructing the database from manually-completed enrollment forms would typically involve manual data entry that can be inaccurate, costly, and time-consuming.

What is needed, therefore, is a system for more effectively administering frequency marketing programs at a lower cost, and with greater participation of consumers, while at the same time avoiding the drawbacks of prior marketing programs. Preferably, such a system would be convenient for consumers, and would provide tangible benefits to participating merchants.

SUMMARY OF THE INVENTION

In one embodiment, the present invention solves the problems of the prior art by providing a system for administering a frequency marketing program or the like that is more efficient, cost-effective, and automated than prior loyalty marketing programs. In one embodiment of the present invention, an important feature is the use of a government-issued identification card for program administration purposes. Rather than using privately-issued loyalty marketing program cards, the present invention uses a government identification card that the vast majority of the population has with them at all times. A driver's license, for example, is a government identification card that is very well suited for use with the present invention. The driver's license has many advantages over privately-issued loyalty marketing program cards, and is useful not only because it is already in the hands of much of the population, but also because it allows the merchant to tap into a large amount of demographic information about people holding driver's license cards. This information can be beneficial in a loyalty marketing program.

Further, the merchant (or more generally, the operator of a given establishment) need not be concerned with replacing lost cards or updating the governmental identification card because the issuing government agency carries out this function. Because the government requires citizens to keep their driver's licenses updated, the merchant can be confident that the information on an individual's card is accurate and up to date. In addition, modern driver's licenses are usually machine readable, so it is rarely necessary to manually key-in information from the card.

The use of a driver's license or other government identification in connection with a loyalty marketing program, in the manner contemplated by the present invention, has many advantages over prior art methods of administering loyalty marketing programs. For example, the present invention lowers costs to participating merchants because privately produced customer identification cards are not needed. The present invention also increases participation in programs requiring customer identification or tracking because it is more convenient for customers to use government-issued identification or information cards than to carry a single-purpose private card. Further, participation requires only that the consumer provide a government identification card for entry through the card reader terminal to capture the information stored on the card. No enrollment forms are required. The present invention also encourages higher participation in the program, which translates into greater marketing impact and increased sales for the merchant. Also, the present invention is convenient for the consumer because he or she can participate in programs administered by many merchants using just one identification card.

In some embodiments of the present invention, the information read from the consumer's identification card is used to tap into a database of additional information about the consumer. Such information could include the consumer's address, and also demographic information that is useful for database marketing purposes. With a privately issued card, this information is often not available. With a government-issued identification card, however, the merchant can obtain costumers' names and addresses for use in assembling a marketing and demographics database and mailing lists. A system employing the present invention may be the only practical way to get much of the information about the consumer because the consumer may be unwilling to provide some information (e.g., birth date) directly.

The information gathering carried out by the present invention can be done without requiring that the customer to fill out an enrollment form or the like. Thus, data entry costs for the information typically required in a database marketing application or loyalty marketing program (i.e., name and address information) are substantially reduced or eliminated. Also, the present invention more effectively allows the burden of record keeping to be moved from the consumer to the merchant or a third party administrator. This is a more customer-friendly and sustainable approach.

With these and other objects, advantages, and features of the invention that may become hereinafter apparent, the nature of the invention may be more clearly understood by reference to the following detailed description of the invention, the appended claims, and to the several drawings herein.

BRIEF DESCRIPTION OF THE DRAWINGS

FIG. 5 is a representation of the consumer database, including identification and demographic information about each of the consumers in the database, as well as information about the transactions carried out by each of the consumers.

FIGS. 7(a) and 7(b) are representations of the data processed at various stages of the flow chart of FIG. 6.

FIGS. 8(a) and 8(b) are representations of two entries in the loyalty marketing criteria database.

DETAILED DESCRIPTION

Figure 1:
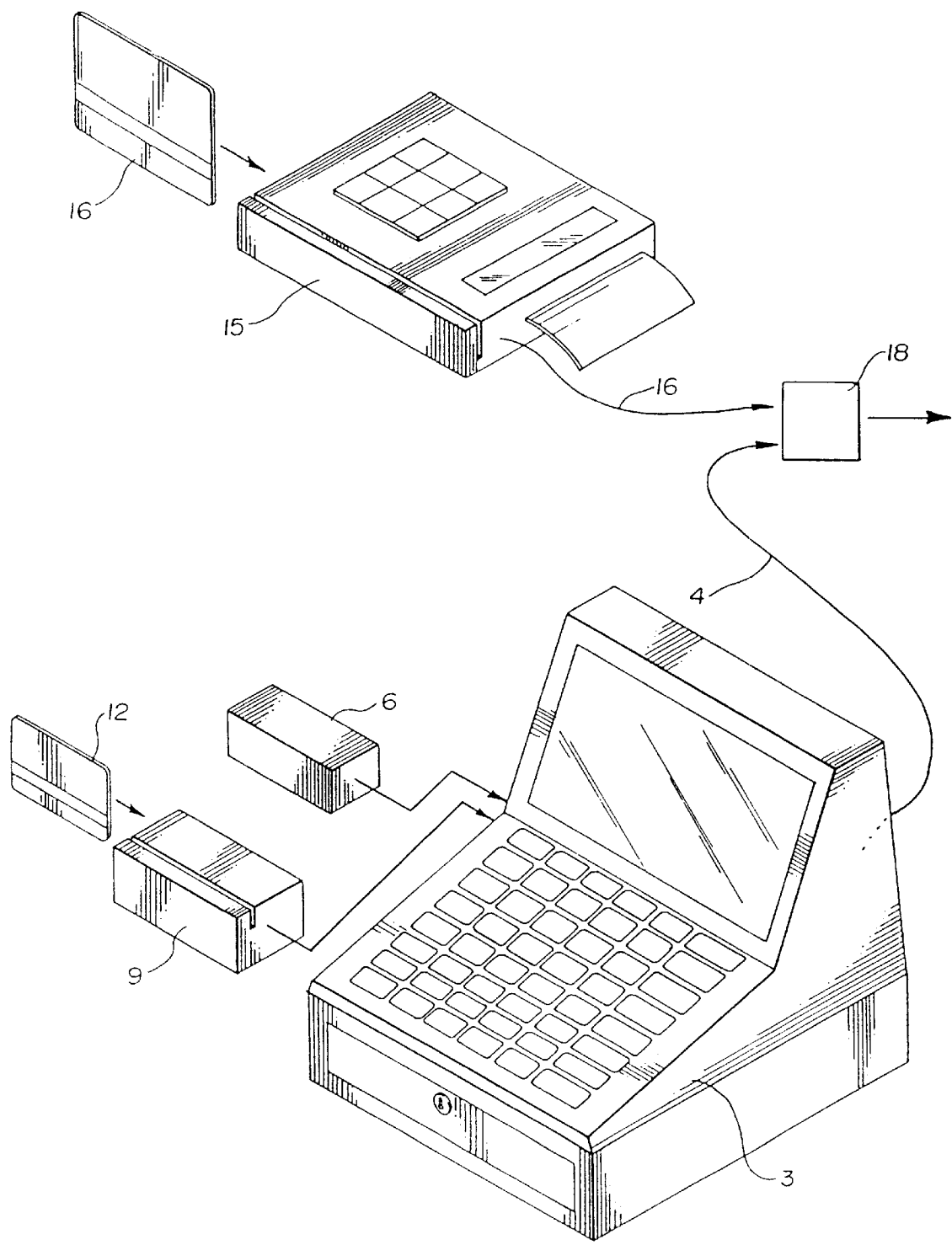
FIG. 1 is a representation of various equipment that may be located at a point of sale and that can be used to carry out the present invention.

The equipment shown in FIG. 1 is, in one embodiment of the present invention, located at the point of sale in a retail store, such as at a check-out counter, or the like. Cash register 3 could be a prior art cash register, such as one that is located at the check-out line at a retail outlet. Register 3 operates in connection with a bar code reader 6, which identifies the product being purchased by a consumer. The bar code read from the product that the consumer wishes to purchase is communicated to the cash register 3, and the register 3 then accesses a database to determine the identity of the product and the price of the product, in the manner known in the art. Instead of automatically reading the bar code, the retail clerk typically can manually type into the cash register the product number that the bar code represents.

A credit card reader 9 also operates in conjunction with the cash register 3. When the consumer approaches the check-out counter, the retail clerk at the counter uses the card reader 9 to charge the cost of the product to the consumer's credit card account. As is known in the art, when the card reader reads the credit card number, a remote database is accessed to verify the consumer's credit, and to log the charge on the consumer's account. Although a credit card reader is shown, payment could obviously be made by any other type of payment card (e.g., a debit card, or an electronic commerce card), by cash, or by check using an automatic check reading and verification system.

Also shown in FIG. 1 is an identification terminal 15 that is used to read an identification card 16. The identification card 16 is preferably a government-issued identification card, such as a driver's license or a state identification card, with data encoded as a bar code or on a magnetic stripe. An important feature of the invention is the capture of identification information that is encoded on the government identification card using a magnetic stripe or bar-code reader such as the identification terminal 15. Such a terminal may have the capability for providing operator use prompts, and performing data capture, data storage, receipt generation, and data transmission to a networked computer that is on-site or at a remote location.

Devices similar to the identification terminal 15 are in use for credit card transactions, check verification, and privately issued card reading, data capture, and data communications. Card reader 9 may be such a terminal. These terminals can be programmable electronic devices with computing and data storage capabilities. Some of these terminals are capable of printing receipts of the transaction for store or customer use, or for record, audit, and other purposes. The receipts have special value in frequent buyer programs as they provide tangible evidence of progress toward earning the programs awards. In one embodiment of the present invention, the equipment shown in FIG. 1 is integrated into fewer devices, or even into a single device. Also, some of the equipment may perform more than one function. For example, the card reader 9 and the identification terminal 15 could be integrated into a single reader that is capable of reading both types of cards, or a single card that performs both functions.

The typical consumer will regularly carry a government-supplied identification card with him or her for use if needed. The potential participants in a loyalty marketing program are exposed to the merchant's program through personal conversation, advertising, or signage. The consumer who decides to participate in the program voluntarily provides his or her government card for passing ("swiping") through the terminal device to log the identity of the consumer at the identification terminal 15 location. The initial enrollment may be in connection with a purchase of goods at the merchant's location, but it need not be. The identification terminal 15 may also optionally allow the consumer (or retail clerk) to key-in additional data about the participant, the transaction, the participant's opinions, or other desired information, as prompted by the prompt queries displayed on the identification terminal 15. The prompts may also ask for the price and identity of the product being purchased, if this information is not otherwise received from the cash register 3.

The identification terminal 15 reads the encoded data from the card as the card is "swiped" through the reader. The location of the data and the encoding format for the data are either established by the issuing government agency, or standardized by national and industry conventions. For example, for driver's licenses, a 20 digit alpha-numerical code could be used that includes the driver's license number and the card holder's date of birth. States, provinces, or countries may encode different data on the identification or drivers license cards or use different encoding schemes. Some states encode the name and birth date on each card using various alpha/numeric coding systems. If the magnetic stripe or bar code is damaged or otherwise unreadable, the retail clerk (or the consumer) can manually key-in the desired information from the card by following prompts displayed by the identification terminal.

Currently, government identification cards use either magnetic or optical encoding, but other types of encoding are possible as well. For example, driver's licenses and the like may ultimately be replaced by so-called smart cards or the like. These cards are essentially small computers that are capable of storing and processing significant amounts of information.

Figure 2A:
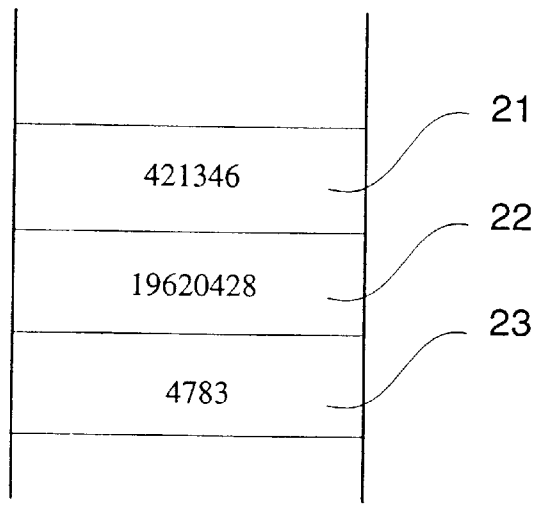
FIGS. 2(a) and 2(b) shows the types of data (e.g., consumer identification and transaction information) that can be gathered at the point of sale by the equipment of FIG. 1.
Figure 2B:
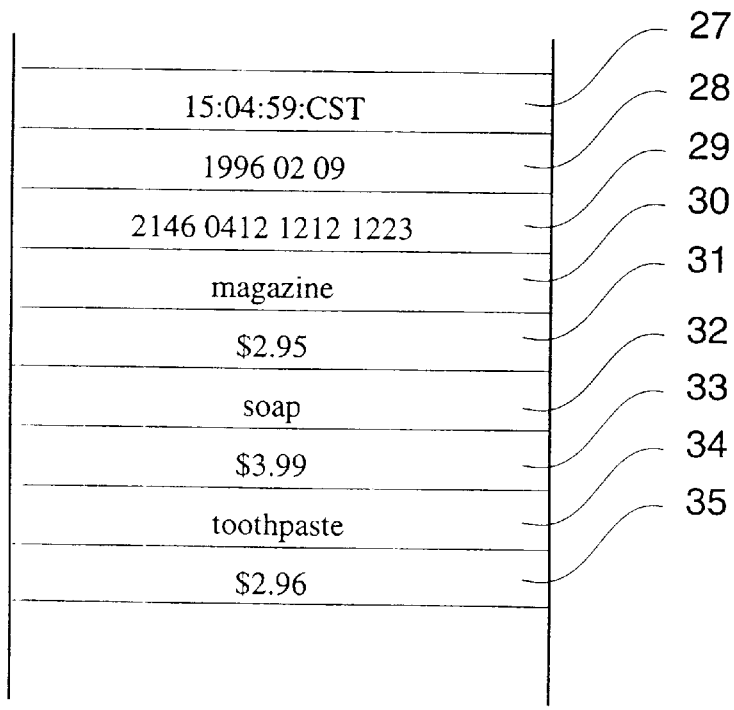

The identification information gathered by the identification terminal 15 can be represented as an identification data record, such as that represented graphically in FIG. 2(*a*). The consumer's identification number 21 is, in one embodiment, simply the driver's license number encoded into the magnetic stripe in the driver's license 16. The identification data record also includes the consumer's birth date 22, which is also taken from the identification card 16. Further, a terminal identifier number 23, which is unique to the terminal, is made part of the identification data record. This information can be used to determine which merchant (or which of the merchant's terminals) generated the identification data record.

The purchase information that is acquired by the register 3 (and associated equipment) can be represented by a purchase data record. For example, as is shown in FIG. 2(*b*), a purchase data record could include the time of transaction 27, the date of the transaction 28, and the consumer's credit card number 29. The purchase data record shown in FIG. 2(*b*) further includes the items purchased by the consumer (30, 32, and 33) the cost of these items, respectively (31, 33, and 35).

Although the embodiment of FIG. 1 would normally be used in a retail establishment or the like where goods (or services) are purchased by the consumer, the present invention need not be limited to such uses. In another embodiment, for example, information about consumers' visits to a given establishment could be recorded, rather than purchase information that is stored in the purchase data record. This type of visit information would include information about the consumer's visit to the establishment, such as the time the consumer entered the establishment, the amount of time the consumer stayed at the establishment, and perhaps information relating to the identity of the establishment itself.

Figure 3:
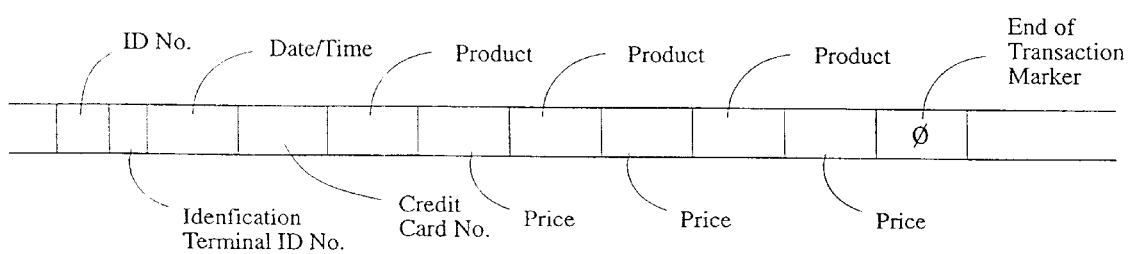
FIG. 3 is a representation of the electronic rendition of the marketing data record created from the data of FIG. 2.

With reference to the embodiment shown in FIG. 1, the information from the identification data record and the purchase data record (all or selected portions thereof) is combined into a marketing data record (i.e., a "marketing record"). Where visit information is used in place of purchase information, the identification information and the visit information is combined into the marketing data record. The format of the marketing data record that corresponds to the embodiment of FIGS. 1 and 2 is shown in FIG. 3. This format includes the consumer identification number, and the terminal identification number from the identification data record, and the date, credit card number, and the products and prices from the purchase data record. The string of products and prices is terminated by a "0" character.

Figure 4:
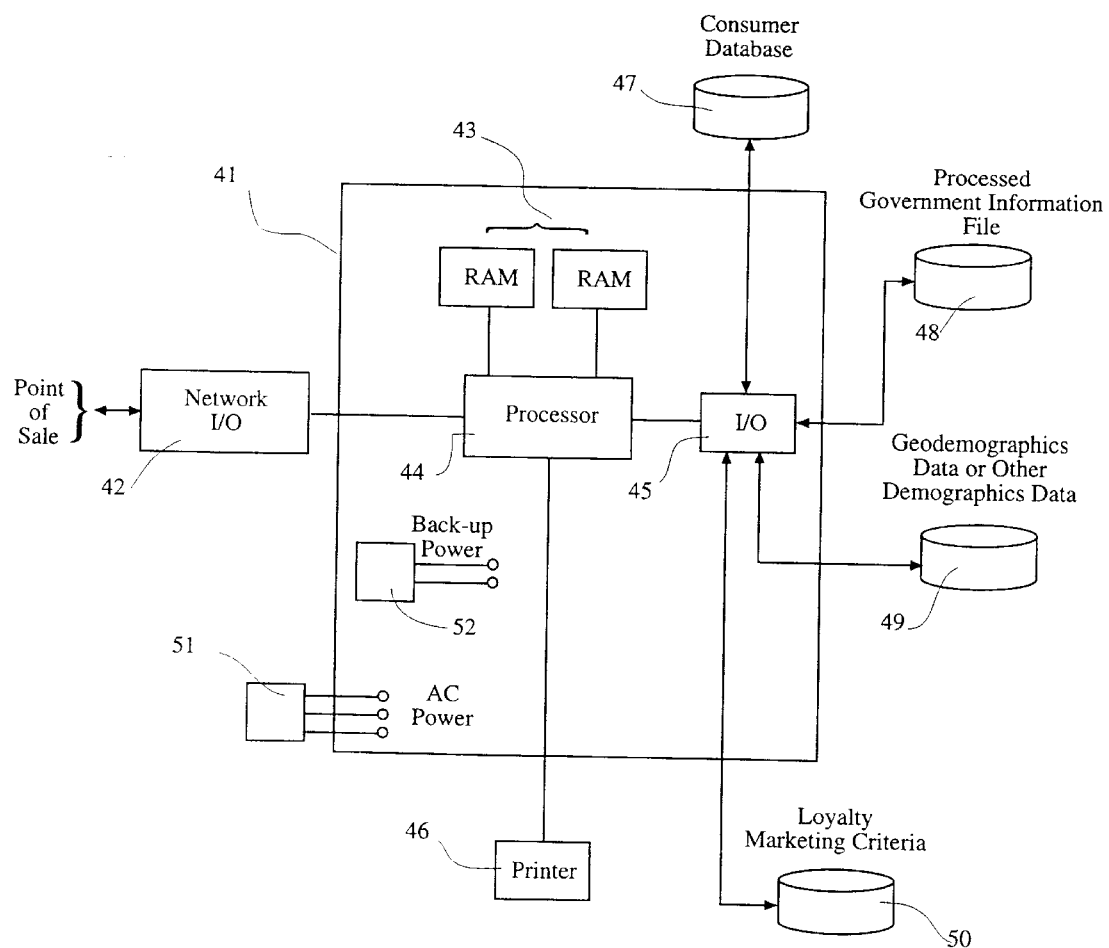
FIG. 4 is a block diagram of a system that processes marketing data records.

A marketing data record similar to that shown in FIG. 3 is transmitted to a central processing system, shown in FIG. 4, either in real time or on a periodic schedule, depending upon the needs of the application and the retailer. In one embodiment, the central processing system is located in a remote location, and is accessed through a wide area network, such as the public telephone network or an internet. In the embodiment shown in FIG. 1, the identification data record and the purchase data record are passed to a communications device 18 and combined into the marketing data record. The communications device in this embodiment includes a modem that dials the phone number of the central processing system and uses proprietary or commercially available communications software to transmit the marketing data record to the central processing system.

The network i/o circuitry 42 of the central processing system 40 receives the marketing data record from the communications device 18. The composition of the network i/o circuitry is dependent upon the type of wide area network used to transfer the marketing data record. The network i/o circuitry could be, for example a bank of modems that receive calls from remote communications devices, or an IP router that routes TCP/IP datagrams. Many other configurations are possible, as would be apparent to one skilled in the art, and the present invention is not meant to be limited to any particular type of network.

Whatever the composition of the network i/o circuitry, it is capable of communicating the received data to the computer 41. The computer 41 comprises local storage 43 and an i/o interface for communicating with various databases or files 47, 48, 49, and 50. As is well known in the art, the computer 41 executes a program stored on a data storage medium so as to carry out the functions of the present invention. The databases 47, 48, 49, and 50 can be simply local storage such as a magnetic or optical disk drive, or can be remote databases that are accessed over a network. The computer also is capable of communicating with a printer 46, and has both main and backup power supplies 51 and 52.

The consumer database 47 is used to store information about the consumers who purchase items at various retail outlets. FIG. 5 is a representation of a data structure that shows the organization of a consumer database in one embodiment of the present invention. The database of FIG. 5 includes, for each consumer (i.e., Joe Smith and Kathleen King), information identifying the consumer 60, demographic information about the consumer 70, and purchase information for one or more retail outlets 80 and 90. The identification information includes the identification number (from the consumer's state-issued identification card 16), and the consumer's name and address. Demographic information 70 about the consumer may include the median income for the consumer's geographic region, the type of home in which the consumer resides, and the median home cost and age for those in the consumer's geographic information. In the embodiment shown, the demographic information is based on the consumer's address, which identifies the geographic region in which the consumer resides.

Information about the consumer's purchases at one or more retail outlets is maintained in the database. In the embodiment of FIG. 5, summary information is displayed that summarizes the individual purchases made by the consumer at each store or restaurant. For example, Joe Smith made 3 visits to ABC Grocery Store, and purchased 17 items. The details of each of the purchases (description of item, cost, date of purchase) are also stored in the database. Similar information about Joe Smith's purchases at XYZ Fast Food Restaurant are also maintained in the database.

Figure 6:
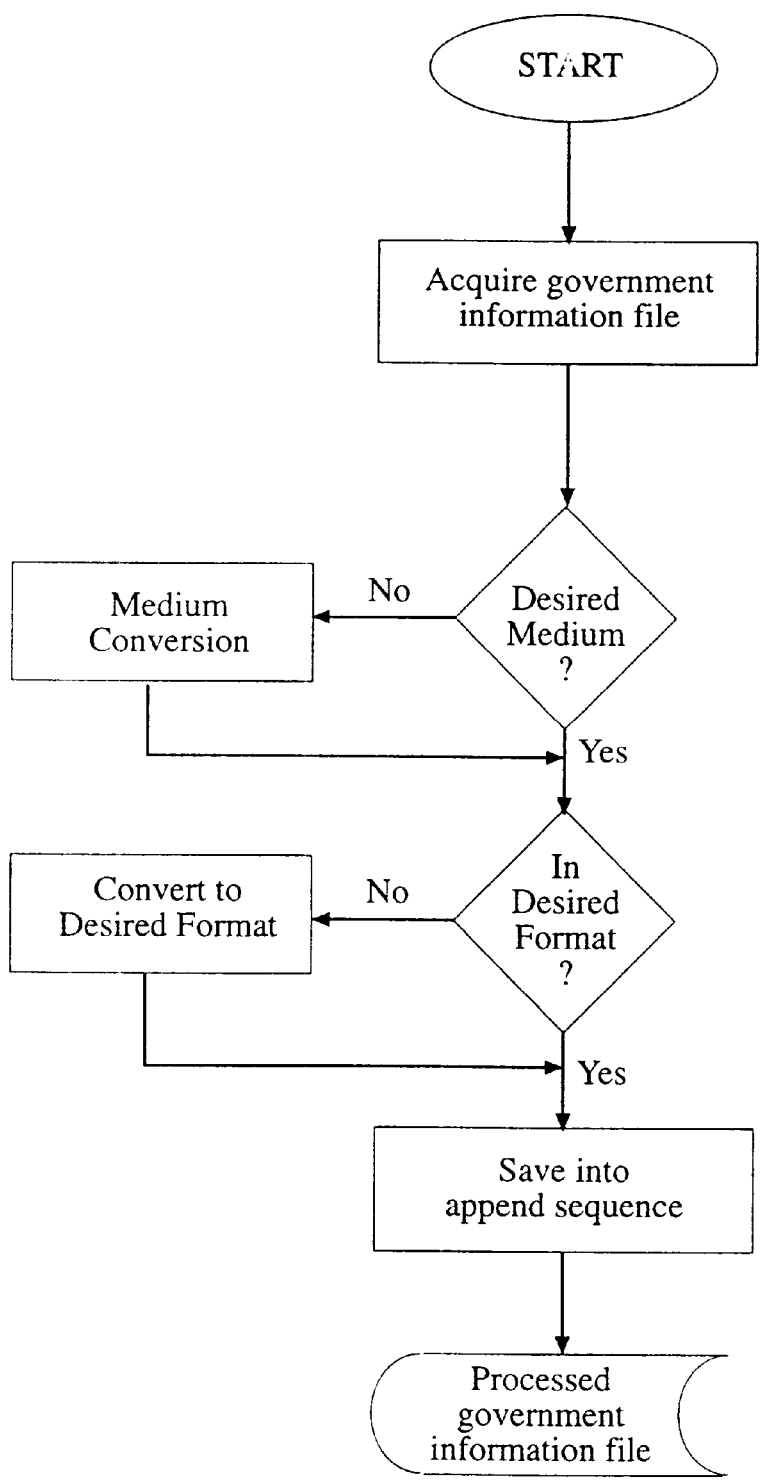
FIG. 6 is a flow chart of the processing of the government information file.

The processed government information database 48 is derived from data retrieved from one or more government agencies, and preferably includes data from more than one state, province, or country. For example, if the identification card 16 is a state-issued driver's license, the department of transportation for the issuing state will typically make available, in some form, data about those who hold driver's licenses. This data is often in an electronically readable format. The present invention processes this information in the manner described in FIG. 6. The step of processing the data is carried out by a computer, so after acquiring the data from the appropriate government agency, the data is converted to a media readable by the computer.

The data is then analyzed to determine whether it is in the proper format. For example, FIG. 7(a) is a representation of one possible format of the data, as received from the governmental agency. The data is then processed so that it is in a format that is appropriate for inclusion into the consumer database or for easy searching by identification number. Such a format is shown in FIG. 7(b), which represents the format of the processed government information file in one embodiment of the present invention, after sorting and reformatting. As noted earlier, the government information database preferably holds information from more than one state or province.

Geodemographic data (or other demographic information) is stored in the database 49. This database includes information that provides some background about the people based on where they live, based on their age, or based on any other information known about the consumers in the consumer database. For example, a consumer's address can provide insight into the type of residence in which the consumer lives (single or multiple family home, apartment, condominium, etc.). Insight about the consumer's income level may be discerned from the city in which the consumer lives, or the street on which the consumer lives. Using the known information about the consumer, accessing a demographic database can provide such information about the consumer. These databases can be constructed using data licensed from organizations (such as MetroMail, Donnelly, Dun & Bradstreet, and Polk) that maintain such marketing and demographics information.

Loyalty marketing criteria is stored in the database 50 shown in FIG. 4. The database 50 stores, in some form, the criteria that must be met in order to receive an award. The loyalty marketing criteria specifies, for each retail outlet, mall, or the like, the requirements for receiving various awards or marketing incentives. For example, as shown in FIG. 8(a), the criteria for ABC Grocery Store is structured as an account balance program. When a consumer's points reach 600 or higher, the consumer qualifies for the first award level. Each award level qualifies the consumer to choose an award from a class of awards. For example, the consumer may be able to choose an award from a class of awards that includes a $25 gift certificate to be redeemed for store merchandise, a $20 cash award, or a gift certificate for another store.

The awards may also be fixed. For example, in an airline's frequent flyer program, the award is typically limited to a free airline ticket, earned after logging a given number of miles. These tickets usually cannot be redeemed for cash. Other programs may have a catalog of prizes that the user can select from, or may involve a stepped discount procedure. The criteria in FIG. 8(a) does not mention a time-frame in which the consumer must accumulate the points, but the criteria in FIG. 8(a) could be modified to apply to purchases taking place within, say, a six month period. This provides added incentive to not only be a repeat customer of ABC Grocery Store, but also to purchase items at ABC Grocery Store often.

FIG. 8(b) represents slightly different loyalty marketing criteria, where the award criteria is more complex than that shown in FIG. 8(a). There are two ways to receive an award at the XYZ Fast Food Restaurant. The first way is to purchase a certain number of hamburgers in a one-month period. As shown in the left side of the chart, purchasing a given number of hamburgers qualifies the consumer for a specific award. For example, purchasing two hamburgers within a given month qualifies the purchaser to a free medium soft drink. More frequent purchases qualify the purchaser for a larger soft drink or additional awards.

The right side of FIG. 8(b) represents an alternate track to receiving an award. As shown, the consumer is given an award based on the number of visits he or she makes to the XYZ Fast Food Restaurant (where a visit might be defined as each time a consumer purchases a meal or part of a meal). If the consumer makes five visits to the XYZ Fast Food Restaurant during a three month period, then the consumer is awarded a certificate that can be redeemed for any sandwich at the XYZ Fast Food Restaurant. As shown in FIG. 8(b), certificates for other awards are given for more than five visits.

The loyalty marketing criteria shown in FIGS. 8(a) and 8(b) are stored in the loyalty marketing criteria database 50. This involves setting up an appropriate data structure for the data and constructing the database, as is well known in the art. Also, although databases 47, 48, 49, and 50 are shown and described as databases, it should be understood that such terminology is not meant to limit the present invention to any particular storage medium. The same data could alternatively be stored in random access memory, on magnetic or optical media as a file or set of files, or on any other media. Further, all of the databases 47, 48, 49, and 50 could be integrated into a single database or file.

Figure 9:
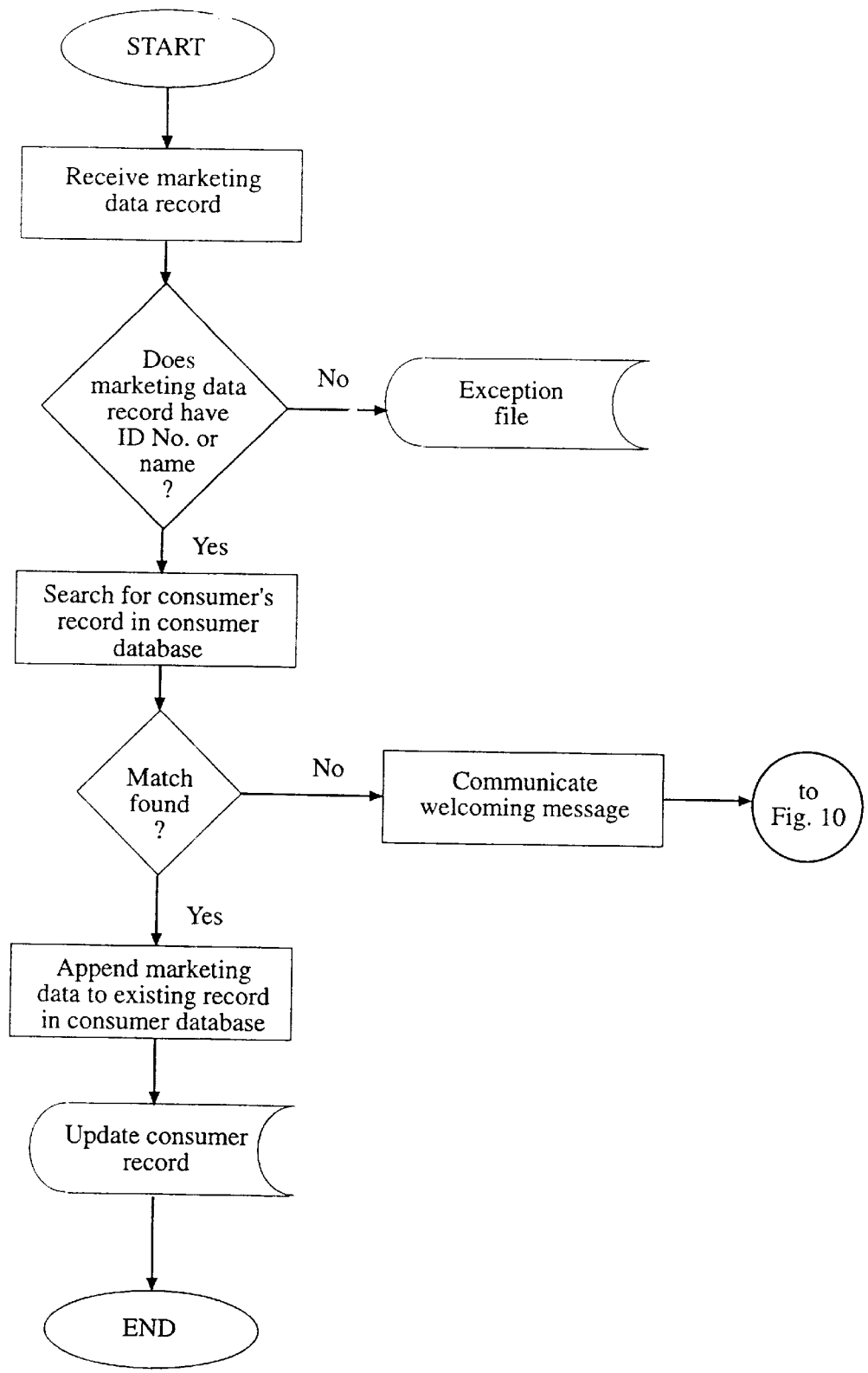
FIGS. 9 and 10 are flow charts of how the marketing data record is processed by the system of FIG. 4.

FIG. 9 is a flow chart of the data capture and data processing aspects of one embodiment of the present invention. The central processing system 40 receives the marketing data record from the point of sale or from the place at which this information is gathered. In one embodiment, the identification information and the purchase information is acquired with the equipment of FIG. 1, and is transmitted to the central processing system 40 as the marketing information, and stored as the marketing data record. The marketing data records received by the central processing system 40 are preferably processed upon receipt, although it is possible to process the marketing data records at a later time. However, with the later embodiment, real-time interactivity and balance reporting, such as that described below, is not available.

Typically, the marketing data record will include an identification number which is simply the consumer's driver's license number or state identification card number. The driver's license number is encoded on the magnetic stripe of the driver's license, so it becomes part of the marketing data record after being read by the identification terminal 15. However, some states will encode on the magnetic stripe of the identification card the person's name, rather than the driver's license number. Thus, in this situation, the marketing data record would not have the identification number, but the consumer's name will be present.

As shown in FIG. 9, the central processing system processes marketing data records by initially analyzing the marketing data record to determine whether an identification number (i.e., the driver's license number) or the consumer's name is present. If not, the marketing data record is placed into a "to be researched" exception file. Otherwise, the existing consumer database 47 (see FIG. 5) is searched for any preexisting record for the consumer, where the search is preferably conducted by searching for the identification number, but alternatively, the search could be conducted by looking for the consumer's name. The central processing system 40 has access to this database as shown in FIG. 4. If a record with the same identification number or the same name is found (with no duplicate names), then the consumer has already been added to the consumer database, so that record only needs to be updated with the new transaction. This is done by appending the new transaction data from the marketing data record to the appropriate portion (e.g., ABC Grocery Store 80) in the consumer's record in the consumer database. In this manner, the consumer's record is updated.

If the consumer has not already been added to the consumer database, then the central processing system may communicate (over the network) to the consumer some type of welcoming message, either by printing a welcoming message, adding such a message to the consumer's receipt, or by displaying such a message. Various types of messages are appropriate, depending on the context and circumstances. The central processing system 40 communicates with the identification terminal and the register over the network connected to the communications device 18.

Figure 10:
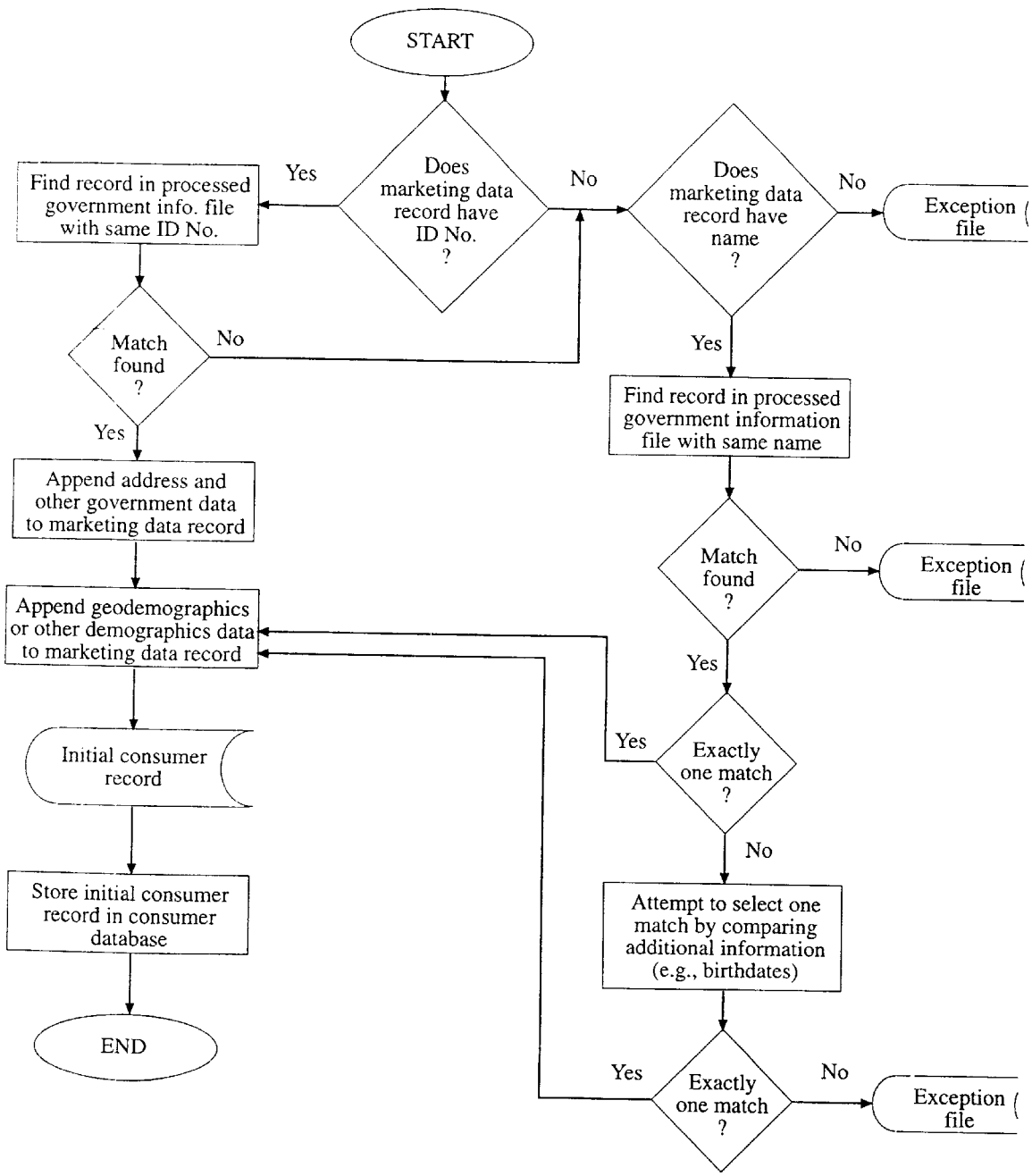

If the consumer has not already been added to the consumer database 47, the consumer's initial record in the consumer database is created in the manner described in FIG. 10. As shown, an attempt is made to match the marketing data record with a record in the processed government information database by first focussing on the identification number, and if necessary, by focussing on the consumer's name and birth date. If the consumer's name does not result in any match, then this failure is noted in another exception file. If there are duplicate matches, additional information from the marketing data record is compared to the multiple matches in an attempt to identify the appropriate match. For example, if the marketing data record includes the consumer's birth date, then the birth date information for each of the multiple name matches in the government information file is compared to the birth date in the marketing data record. This will often eliminate all but one match.

When the appropriate record in the processed government information database is found, this information is incorporated into the identification portion 60 of the consumer's record. See FIG. 5. Additional demographic information can also be appended to the consumer's record by referencing the demographics database 49. This information is assembled into the demographics portion 70 of the consumer's record in FIG. 5. This initial consumer record is stored in the consumer database 47.

In the embodiment described above in connection with FIGS. 9 and 10, existing consumer records are only updated to include the new marketing information for the new transaction. In other words, in one embodiment of the present invention, the government information database and the demographics database are not searched because these databases were searched when the consumer's initial marketing data record was created. However, in an alternate embodiment, these databases can be referenced periodically (whether or not in connection with a transaction) after the initial consumer record is created. For example, the government information file could be updated with National Change Of Address information available from third parties so that a consumer record can be updated to reflect the consumer's new address. Similarly, demographic information can be updated as the demographic database changes, or as the information about the consumer changes (e.g., changes in age bracket, changes in address or income level).

Figure 11:
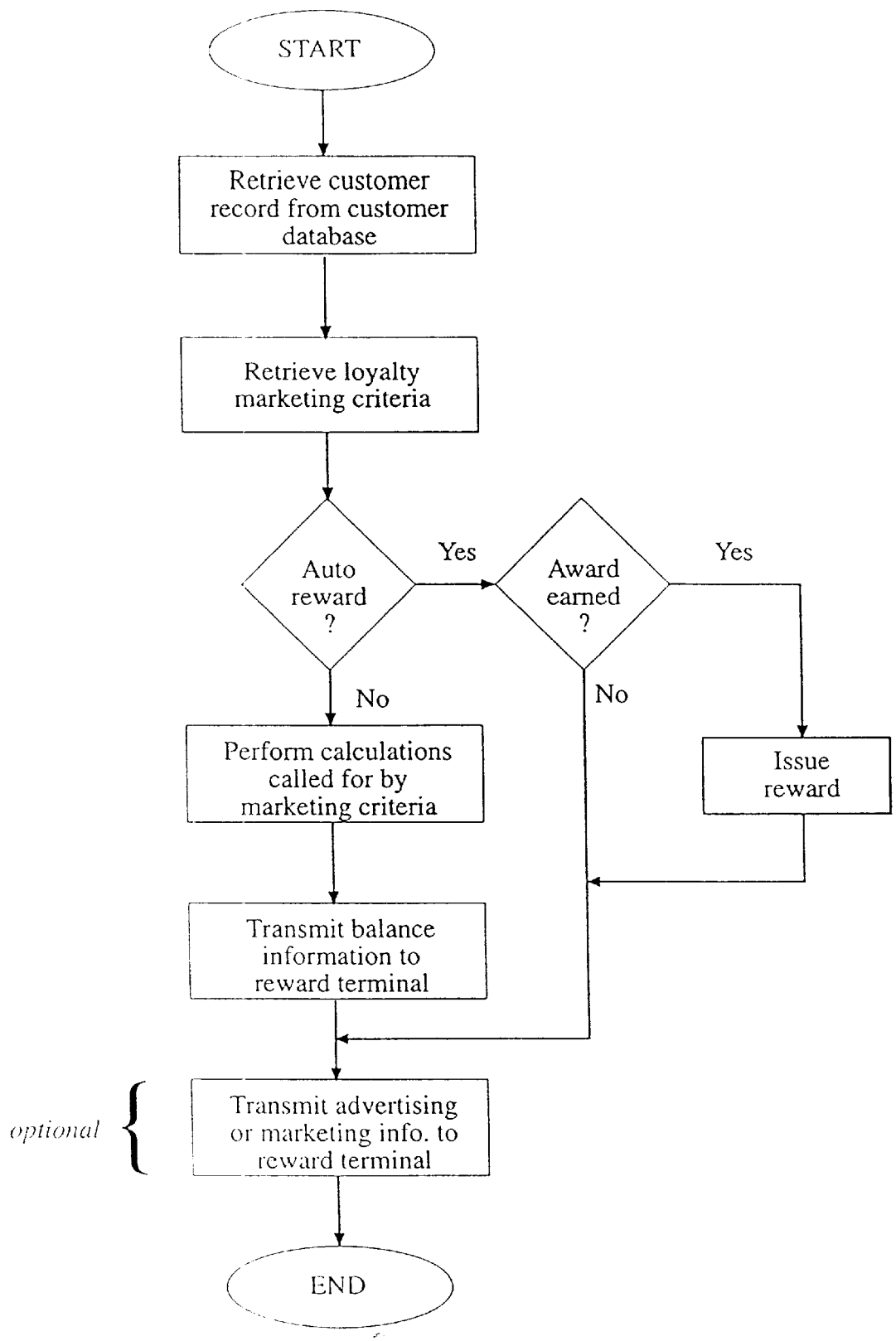
FIG. 11 is a flow chart of the operation of the loyalty marketing process in one embodiment of the present invention.

FIG. 11 outlines the procedure for analyzing the consumer database and determining whether a given consumer has earned an award or the like. To perform the analysis for a given consumer, the consumer's record is retrieved from the consumer database. (Alternatively, where the initial record for a consumer has just been created or updated in response to a transaction carried out by the consumer, this information may already be readily available.) The loyalty marketing criteria from the loyalty marketing criteria database 50 is also retrieved. This information is compared to determine whether the information stored in the consumer's record, which details the consumer's spending activities at various stores or restaurants or the like, meets the criteria for a given establishment.

For example, suppose Joe Smith, a consumer with a driver's license number 421346, visits the ABC Grocery store and purchases three items. At the check-out line, the equipment shown in FIG. 1 gathers the appropriate information that is assembled into a marketing data record as shown in FIGS. 2 and 3. ABC Grocery Store has a direct connection to the central processing system in FIG. 4, so the marketing data record is transmitted to the central processing system while Joe Smith waits. The central processing system processes Joe Smith's consumer record or creates an initial consumer record for Joe Smith as described in FIGS. 9 and 10. The resulting record is shown in FIG. 5.

Also while Joe Smith waits, the loyalty marketing criteria for ABC Grocery Store (shown in FIG. 8(*a*)) is accessed so that the central processing system can compare the information in the consumer record to the criteria required by the ABC Grocery Store. As can be seen from FIG. 8(a), the minimum number of points required in order to receive an award at ABC Grocery Store is 600 points. If Joe Smith has less than 600 points, no award is granted. If Joe Smith has 600 or more points, then he is entitled to an award.

Joe Smith has an Incentive Balance at ABC Grocery store that totals $203.21, as shown in FIG. 5. This balance must be converted into points in order to determine whether Joe Smith is entitled to an award. The conversion ratio can be set by ABC Grocery Store, depending on the marketing objectives of ABC Grocery Store. But for purposes of illustration, a simple conversion ratio could be that one dollar equals one point. Thus, Joe Smith would have only 203 points, and would not be entitled to an award. The central processing system 40 may transmit this message to the transaction equipment in FIG. 1 for display on the identification terminal 15. Also, Joe Smith's updated balance could be transmitted to the identification terminal so that the balance could be displayed on the terminal or printed on a receipt.

If Joe Smith had earned an award, then the procedure for granting the award depends on the type of loyalty marketing protocol that is set up. For example, for a loyalty marketing plan that uses an automatic reward procedure, an award would be automatically issued to the consumer when the conditions for granting an award are satisfied. This could be done by printing an award certificate and mailing it to the consumer. Alternatively, the retailer at the point of sale might be notified by the central processing system so that the retailer could issue the reward to the consumer directly, in the form of merchandise, cash, a discount, or the like. Redeeming or granting such an award will debit the consumer's account. After redemption, the consumer is preferably made aware of his or her new balance.

In an alternate embodiment, the marketing information is communicated to the central processing system 40 in a batch mode, where transactions are stored for later transmission to the central processing system either at preset times, or when a sufficient number of transactions have been stored. In such an embodiment, accurate current balances would not be available at the time of transaction.

Also shown in FIG. 11 is the step of transmitting an advertisement to the point of sale for display to the consumer. Since the consumer database provides insight into the consumer's spending habits, it is possible to provide personalized advertisements that would likely appeal to the consumer, based on the consumer's prior purchases. Thus, in one embodiment, the central processing system may direct the equipment of FIG. 1 to display print or advertising messages based on the member's purchase patterns, location, demographics, or the like. These advertising messages can be placed on a receipt, or displayed on a screen visible to the consumer. In addition, the consumer database created with the present invention can be used to segment and create mailing lists for earning statements, personalized direct mail, mailing labels, and other targeted advertising to support the loyalty program or other marketing efforts of the program sponsor or its affiliates.

The present invention has been described in the context of a specific types of loyalty marketing application, but the present invention has many uses. Some of these uses include, without limitation, the following marketing applications: frequent buyer and loyalty marketing promotions and programs, customer entry into chance sales promotions and contests, personalized store couponing systems, personalized store purchase rebates, data capture for market research applications, pre-paid phone cards as premiums, and tracking activities of employees or dealers for sales inventive programs, retail billing (invoicing) and revolving credit payment systems, check approval processes where the drivers license number is recorded on the check or as part of the transaction, check cashing approval systems, and charity donation record system input for customer delivered in-kind donations and record of donor driving expenses.

The present invention can also be used for identification purposes in connection with building entry log systems, parking garage monthly parking pass identification systems, airline "ticketless" ticketing systems, gated community identification system input, local and long distance telephone calling cards, school attendance taking, input for parole and home detention criminal penalties, medical records for tuberculosis dosage, depression medication, methadone, etc., singles bar "cross the room" electronic introductions, replacement for public library cards, replacement for YMCA, country club, and health club identification cards, equipment and car rental identification and tracking system, voter registration systems, kiosk information systems, over the road trucker logs, temporary help agencies payroll and time clock systems, hotel/motel room key systems, conference and convention participant identification systems, sporting event enrollment and results tracking and participant communications, proof of age for cigarettes or alcohol or gambling purchases and a verification log used by a merchant for such purposes.

Although the present invention has been shown and described with respect to preferred embodiments, various changes and modifications that are obvious to a person skilled in the art to which the invention pertains, even if not shown or specifically described herein, are deemed to lie within the spirit and scope of the present invention. Any numbering of the elements of the following claims is merely for convenience and is not intended to suggest that the ordering of the elements of the claims has any particular significance other than that otherwise expressed by the language of the claims.

What is claimed is:

1. A method for collecting information relating to a consumer's visits to a given consumer establishment and assembling marketing data relating to the consumer, where the method comprises the acts of:

(a) capturing visit information about one or more consumer visits to the establishment;

(b) capturing basic identification information about the consumer, wherein the basic identification information is taken from the consumer's government-issued identification card;

(c) electronically retrieving additional, non-transactional government information about the consumer from a government information database, wherein the government information database is indexed by the basic identification information taken from the consumer's government-issued identification card, and wherein the consumer is required by the government to maintain up-to-date information in the government information database;

(d) electronically assembling a marketing data record by combining the visit information, the additional, non-transactional government information and the basic identification information;

(e) storing the marketing data record in a consumer database;

(f) periodically updating the marketing data record with updated additional, non-transactional government information by periodically electronically retrieving updated additional, non-transactional government information about the consumer from the government information database; and (g) analyzing the marketing data record in the consumer database to determine whether the consumer meets predefined criterion for a promotional action.

2. A method for collecting and analyzing information relating to consumer purchases and assembling marketing data relating to the consumer, where the method comprises the acts of:

(a) capturing purchase information about a consumer's purchase of goods or services, including information about the goods or services purchased;

(b) reading the consumer's government-issued identification card to acquire basic identification information about the consumer at the time of purchase, wherein the basic identification information includes an identification number that is stored on the government-issued identification card;

(c) acquiring the consumer's address by electronically retrieving the consumer's address from an address database, wherein the address database is maintained by the government and is indexed by the identification number read from the consumer's government-issued identification card, and wherein the government requires the consumer to keep an up-to-date address in the address database;

(d) electronically assembling a marketing data record by combining the purchase information and the basic identification information with the address acquired in act (c);

(e) storing the marketing data record in a consumer transaction database;

(f) periodically updating the marketing data record in the consumer transaction database by again electronically retrieving the consumer's address from the address database and updating the consumer's address in the marketing data record if it has changed; and (g) analyzing the marketing data record to determine whether the consumer meets predefined criterion for a promotional action based on the consumer's purchase of goods or services and the consumer's address, wherein the predefined criterion relates to amount or number of purchases, dates of purchases, and products or services purchased.

3. The method of claim 2, wherein act (g) includes the acts of:

identifying consumers who meet the predefined criterion for a promotional action based on the consumer's purchase of goods or services; and issuing an award to the identified consumer(s).

4. The method of claim 2, wherein act (g) includes the acts of:

calculating a consumer balance, wherein the consumer balance is a total of previous purchases by the consumer; and notifying the consumer, at the time of purchase, of the consumer's balance.

5. The method of claim 2, further comprising the act of:

(h) acquiring demographic information for the consumer by retrieving demographic data from a database, wherein the demographic information is retrieved based on information in the consumer's marketing data record.

6. The method of claim 5, wherein the demographic data is geodemographic data that is retrieved from the database based on the consumer's address in the marketing data record.

7. A system for collecting and analyzing information relating to consumer purchases and assembling marketing data relating to the consumer, comprising:

(a) transaction equipment that acquires and captures purchase information about a consumer's purchase of goods or services and basic identification information about the consumer, wherein the purchase information includes information about the goods or services purchased, and the basic identification information is taken from the consumer's government-issued identification card;

(b) a network connected to the transaction equipment; and (c) a processing system that is connected or connectable to the network, wherein the processing system comprises a computer, a consumer database, a government information database, and a loyalty marketing database, wherein the processing system retrieves additional, non-transactional government information about the consumer from the government information database, wherein the government information database is indexed by the basic identification information taken from the consumer's government-issued identification card, and wherein the consumer is required by the government to maintain up-to-date information in the government information database, stores a marketing data record in a consumer transaction database, wherein the marketing data record is a combination of the purchase information, the basic identification information, and the additional, non-transactional government information, periodically updates the marketing data record with updated additional, non-transactional government information by periodically retrieving updated additional, non-transactional government information about the consumer from the government information database and updating any additional, non-transactional government information that has changed; and analyzes the marketing data record in the consumer transaction database to determine whether the consumer meets predefined criterion for a promotional action, wherein results thereof may be used for the promotional action.

8. The system of claim 7, wherein the processing system further comprises:

a demographics database, and wherein the processing system acquires demographic information for the consumer by retrieving demographic data from the demographics database, wherein the demographic information is retrieved based on information in the consumer's marketing data record.

9. The system of claim 8, wherein the demographic database includes geodemographic data that is retrieved from the database based on the consumer's address in the marketing data record.

10. A method comprising the acts of:

(a) acquiring purchase information about a consumer's purchase of goods or services, wherein the purchase information is collected at the point of sale and includes a description of the goods or services purchased and the date of sale;

(b) acquiring basic identification information about the consumer by reading the consumer's government-issued identification card at the point of sale, wherein the basic identification information includes an identification number and a date of birth for the consumer, both of which are stored on the government-issued identification card;

(c) electronically acquiring supplemental, non-transactional government data from a government information database, wherein the supplemental, non-transactional government data includes address information for the consumer, wherein the government requires the consumer to keep an up-to-date address in the government information database, and wherein the government maintains the government information database;

(d) analyzing the supplemental, non-transactional government data to determine whether it is in the desired medium;

(e) converting the supplemental, non-transactional government data to the desired medium if the supplemental, non-transactional government data is not already in the desired medium;

(f) analyzing the supplemental, non-transactional government data to determine whether it is in the desired format;

(g) converting the supplemental, non-transactional government data to the desired format;

(h) electronically storing the converted supplemental, non-transactional government data to a storage medium;

(i) attempting to match the consumer's name in the supplemental, non-transactional government data;

(j) finding a single match in the supplemental, non-transactional government data using another characteristic of the consumer if the attempt in act (i) results in more than a single match;

(k) acquiring non-transactional government information about the consumer by using the match in the supplemental, non-transactional government data, wherein the information includes the consumer's address;

(l) electronically assembling a personal information database by appending the non-transactional government information about the consumer acquired in act (k) to the information acquired in act (b);

(m) electronically assembling a transaction database that includes the purchase information acquired in act (a) and also data from the personal information database;

(n) periodically updating the personal information database by periodically electronically retrieving updated supplemental, non-transactional government data about the consumer from the government information database, detecting differences between the supplemental, non-transactional government data and the updated supplemental, non-transactional government data, and changing the corresponding information in the personal information database;

(o) analyzing the transaction database to determine whether the consumer meets a predefined criterion for an award based on the consumer's purchase of goods or services, wherein the predefined criterion relates to amount of purchases, dates of purchases, and products or services purchased; and (p) calculating a consumer balance, wherein the consumer balance is calculated based on prior purchases by the consumer along with the current purchase.

11. The method of claim 10, further comprising the act of:

(q) notifying the consumer, at the time of purchase, of the consumer's balance.

12. The method of claim 2, wherein information about the goods or services purchased includes the purchase price.

13. The method of claim 2, wherein act (a) includes the acts of:

incrementing a counter associated with the user's number of visits each time the user purchases goods or services;

storing the updated counter.

14. A method for establishing and maintaining a loyalty marketing data record for collecting transaction information relating to a consumer's visits to a given consumer business, the method comprising:

(a) capturing a primary key from the consumer's government-issued identification card by scanning the card during an initial enrollment visit of the consumer to the consumer business;

(b) capturing transaction information about the consumer's initial enrollment visit to the consumer business;

(c) indexing by the primary key a loyalty marketing data record for the consumer that is developed to store the consumer's transaction information from the consumer's visits to the consumer business, wherein the loyalty marketing data record is stored in a consumer database; and (d) locating the consumer's loyalty marketing data record for future additions of transaction information from subsequent visits of the consumer to the consumer business by capturing the primary key from the consumer's government-issued identification card and using the primary key to find the consumer's loyalty marketing data record in the consumer database.

15. The method of claim 14 wherein the primary key is a customer identification number taken from the consumer's government-issued identification card, and wherein the act of indexing by the primary key comprises indexing by the customer identification number.

16. The method of claim 14 wherein the government-issued identification card is a driver's license and the customer identification number is a driver's license number, and wherein the act of indexing by the primary key comprises indexing by the driver's license number.

17. The method of claim 14 wherein the act of locating comprises:

(a) searching for customer identification numbers in the consumer database to match the primary key in order to locate the consumer's loyalty marketing data record; and (b) if a customer identification number cannot be found to match the primary key, searching for consumer names in the consumer database to match the primary key in order to locate the consumer's loyalty marketing data record.

18. The method of claim 14 further comprising:

(e) electronically retrieving additional, non-transactional government information about the consumer from a government information database, wherein the government information database is indexed by the primary key taken from the consumer's government-issued identification card, and wherein the consumer is required by the government to maintain up-to-date information in the government information database;

(f) electronically adding the additional, non-transactional government information to the loyalty marketing data record;

(g) periodically updating the loyalty marketing data record with updated additional, non-transactional government information by periodically electronically retrieving updated additional, non-transactional government information about the consumer from the government information database; and (h) analyzing the loyalty marketing data record in the consumer database to determine whether the consumer meets predefined criterion for a promotional action.

* * * * *